US012583733B2

(12) United States Patent
Cahen et al.

(10) Patent No.: US 12,583,733 B2
(45) Date of Patent: Mar. 24, 2026

(54) TAP FOR DISPENSING EITHER A FIRST OR A SECOND LIQUID

(71) Applicant: BE WTR SA, Lausanne (CH)

(72) Inventors: Antoine Cahen, Lausanne (CH); Jean-Luc Denisart, Cully (CH); Etienne Lebreton, Crissier (CH)

(73) Assignee: BE WTR SA, Lausanne (CH)

( * ) Notice: Subject to any disclaimer, the term of this patent is extended or adjusted under 35 U.S.C. 154(b) by 146 days.

(21) Appl. No.: 18/705,513

(22) PCT Filed: Aug. 29, 2022

(86) PCT No.: PCT/IB2022/058077

§ 371 (c)(1),
(2) Date: Apr. 26, 2024

(87) PCT Pub. No.: WO2023/026264

PCT Pub. Date: Mar. 2, 2023

(65) Prior Publication Data

US 2024/0279045 A1 Aug. 22, 2024

(30) Foreign Application Priority Data

Aug. 27, 2021 (CH) ................................ 70208/2021

(51) Int. Cl.
*B67D 1/14* (2006.01)
*B67D 1/12* (2006.01)

(52) U.S. Cl.
CPC ......... *B67D 1/1455* (2013.01); *B67D 1/1275* (2013.01); *B67D 1/1477* (2013.01)

(58) Field of Classification Search
CPC ... B67D 1/1455; B67D 1/1275; B67D 1/1477
(Continued)

(56) References Cited

U.S. PATENT DOCUMENTS 491,272 A 2/1893 Schier
603,495 A 5/1898 Dredge et al.
(Continued)

FOREIGN PATENT DOCUMENTS

WO 2011008491 A1 1/2011

OTHER PUBLICATIONS

International Search Report and Written Opinion for PCT/IB2022/058077 mailed Nov. 16, 2022, 11 pages.
(Continued)

*Primary Examiner* — Jeremy Carroll
(74) *Attorney, Agent, or Firm* — BLANK ROME LLP

(57) ABSTRACT

Tap (1) for dispensing a first liquid and/or a second liquid, the tap comprising: —a first inlet (11*a*) and a second inlet (11): —a first outlet (12*a*) and a second outlet (12*b*): —a handle (10) adapted to rotate around a centre point (100) so as to be placed alternatively in: —a first open position corresponding to a rotation of the handle (10) of a first angle (a1) with respect to a vertical reference axis (101) passing through said centre point, or in: —a closed position corresponding to a rotation of the handle (10) of a second angle (a2) with respect to said reference axis (101), or in: —a second open position corresponding to a rotation of the handle (10) of a third angle (a3) with respect to said reference axis (101), wherein said first liquid flows through the first inlet (11*a*) and the first outlet (12*a*) when the handle is at its first open position, through the second inlet (lib) and second outlet (12*b*) when the handle is at is second open position and wherein both first and second liquids are prevented from flowing when the handle is at its closed position, and wherein the tap comprises a distribution unit, said distribution unit being arranged so as to allow said handle to spontaneously reach said closed position in absence of external action.

15 Claims, 16 Drawing Sheets

(58) Field of Classification Search
USPC .......................................................... 222/509
See application file for complete search history.

(56) References Cited

U.S. PATENT DOCUMENTS

| | | | | |
|---|---|---|---|---|
| 2,619,387 A | 11/1952 | Cornelius et al. | | |
| 2,675,018 A * | 4/1954 | Bender | ................ | B67D 1/1455 137/636 |
| 9,517,924 B2 * | 12/2016 | Meyer | .................. | B67D 3/0016 |
| 10,589,978 B2 * | 3/2020 | Sevcik | ................. | B67D 1/0021 |
| 11,760,621 B1 * | 9/2023 | Curci | ................... | B67D 1/1466 222/145.8 |

OTHER PUBLICATIONS

International Preliminary Report on Patentability for PCT/IB2022/058077 mailed Feb. 27, 2024, 8 pages.

* cited by examiner

TAP FOR DISPENSING EITHER A FIRST OR A SECOND LIQUID

RELATED APPLICATIONS

This application is a national phase of PCT/IB2022/058077, filed on Aug. 29, 2022, which claims priority to CH Application No. 070208/2021, filed on Aug. 27, 2021. The contents of these applications are hereby incorporated by reference in their entirety.

TECHNICAL DOMAIN

The present invention concerns a tap for dispensing alternatively two liquids.

RELATED ART

Taps allowing the dispensing of different types of liquids are usually called n-way taps, according to the number "n" of liquids that can be dispensed.

Dispensing multiple types of liquids is an essential feature of standard taps. The most obvious example is the hot/cold water configuration, but other important examples include still/sparkling water,
chilled/ambient water,
filtrated/wash and dish water,
standard/boiling water,
soda/water of different types of sodas,
different types of beers,
etc. . . . .

Cold and hot water are usually both coming from the same pipe. There is no problem to mix them in the tap extremity. On the contrary, filtrated drinking water and standard tap water have different composition and properties due to the filter. They need to have separate nozzles for avoiding to mix them.

There are two different opening system for such taps. On one hand, stable openings allow to regulate the intensity of the liquid flow, while on the other hand, so called temporized taps provide a liquid flow in a 1-0 manner, meaning that the flow intensity cannot be chosen.

Another type of taps is provided by beer taps for dispensing draught beer. The opening of such taps is usually commanded by handles that were initially designed for actioning pumps. They have been progressively replaced by handles actioning normally closed valves for sparing beer. These valves usually 1-0 valves in order to optimize the flow to avoid foam excess. Moreover, there are often several nozzles for the different types of beer, and the taps are optionally chilled by a recirculation pump for offering an optimal beer temperature.

Document WO2011008491A1 discloses a tap that allows at least three streams of draught beers to be dispersed from one keg handle. The handle commands valves associated to the different type of draught beers. The choice of the valve to be opened is made by rotating the handle around the handle axis and the opening of the corresponding valve is made by rotating the handle around a fixed point. Two different rotations are therefore needed to choose and open a valve. Moreover, the tap is limited to beer keg and is not meant to be placed on other systems such as domestic water distribution networks.

All the abovementioned taps may be equipped with different types of nozzles that can serve for example to spare water, redirect or increase/decrease a liquid flow. In particular, tap nozzles may be used to increase the aeration of a liquid flowing out of a tap.

When the liquid of interest is water, aeration may be a key factor in view of an activation of the water. By an activation of the water, it is meant that the water is submitted to specific electromagnetic field in order to obtain a good homogeneity of dissolved gasses and minerals, minimizing therefore the propension of the water to form calcification deposit.

Indeed, when submitted to certain electromagnetic fields, water is agitated at a molecular level by the fact that $H_2O$ molecules are attracted by the field but not the other water components. This creates a molecular "shake" that enhance water homogeneity with impact on nanobubbles$_1$ and water molecule clusters. The water activation supposes the application of specific electromagnetic fields on a water which is rich in minerals and well aerated.

Water networks have usually a low dissolved air concentration for several reasons such as the succession of pumps, tubes angles, and temperature and pressure variations which tend to degas the water.

There is therefore a need for two-ways taps with a simple single handle for commanding the opening of the tap outlet that are not limited to beer draught, but adaptable on arbitrary liquid distribution networks. Advantageously, such two-way taps shall be provided with mechanisms guaranteeing a normally closed state when no external force is applied on the handle.

SHORT DISCLOSURE OF THE INVENTION

An aim of the present invention is to provide a 2-way tap that overcomes the shortcomings and limitations of the state of the art.

Another aim of the present invention is to provide a two-way tap which is normally closed in absence of external action.

According to the aims invention, these aims are attained by the object of the attached claims, and especially by a tap adapted for dispensing a first liquid and/or a second liquid, the tap comprising:

a first inlet and a second inlet;
a first outlet and a second outlet a handle adapted to rotate around a centre point so as to be placed alternatively in:

- a first open position corresponding to a rotation of the handle of a first angle with respect to a vertical reference axis passing through said centre point, or in;
- a closed position corresponding to a rotation of the handle of a second angle with respect to said reference axis, or in;
- a second open position corresponding to a rotation of the handle of a third angle with respect to said reference axis, wherein said first liquid flows through the first inlet and the first outlet when the handle is at its first open position, through the second inlet and second outlet when the handle is at is second open position and wherein both first and second liquids are prevented from flowing when the handle is at its closed position, and wherein the tap comprises a distribution unit, said distribution unit being arranged so as to allow said handle to spontaneously reach said closed position in absence of external action.

According to one embodiment, the distribution unit may comprise a first piston and a second piston, the first piston being able to move between a first flowing position liberating the first outlet allowing the first liquid to flow out of the first outlet when the handle is in the first open position, and a first hermetic position obstructing the first outlet preventing the first liquid to flow out of the first outlet when the handle is in the closed or second open position, and the second piston being able to move between a second flowing position liberating the second outlet allowing the second liquid to flow out of the second outlet when the handle is in the second open position, and a second hermetic position obstructing the second outlet preventing the second liquid to flow out of the second outlet when the handle is in the closed or first open position.

The first and/or second piston can be configured so that, when the handle is the closed position, the pressure applied by the first liquid on a first upper surface of the first piston compensates the pressure applied by the first liquid on a first lower surface of the first piston, and so that the pressure applied by the second liquid on a second upper surface of the second piston compensates the pressure applied by the second liquid on a second lower surface of the second piston.

The first piston can be disposed in a first chamber and the second piston can be disposed in a second chamber, the first chamber and the second chamber being devoid of fluid communication when the handle is in the closed position.

The distribution unit may further comprise a first toggle mechanism relating the handle to the first piston and a second toggle mechanism relating the handle to the second piston, the first and second toggle mechanisms being adapted to convert a rotation of the handle into a linear movement of the first and second piston.

Each of the first and second toggle mechanism may comprise an upper plate rotatably mounted around the centre point, and a lower plate rotatably fixed to the upper plate around a pivot, the upper plate being in direct contact with a lever integrally fixed with the handle, and the lower plate being in direct contact with the first or the second piston.

The distribution unit may further comprise a first lower O-ring and a first upper O-ring that are mounted on the first piston, the first lower O-ring being disposed so as to hermetically obstruct the first outlet when the handle is in the second position, and the first upper O-ring being disposed so as to prevent the first liquid to reach a handle mechanism, and further comprising a second lower O-ring and a second upper O-ring that are mounted on the second piston, the second lower O-ring being disposed so as to hermetically obstruct the second outlet when the handle is in the second position, and the second upper O-ring being disposed so as to prevent the second liquid to reach the handle mechanism.

The first and/or second upper and/or lower O-rings can be arranged so that when the handle is released, the pressure forces differential of the first and/or second upper and/or lower O-rings causes the first and/or second piston to move so that the handle reaches the closed position.

A first lower external diameter of the first lower O-ring and a first upper external diameter of the first upper O-ring may be equal, and/or wherein a second lower external diameter of the second lower O-ring and a second upper external diameter of the second upper O-ring may be equal.

Each of the first and second upper and lower O-rings can have a circular, ellipsoidal or rectangular section.

The distribution unit may further comprise:

- a first spring that is coiled up around a first portion of said first piston, and
- a second spring that is coiled up around a second portion of said second piston, wherein said first spring is compressed when the handle is moved from the close position to the first open position, and wherein said second spring is compressed when the handle is moved from the close position to the second open position.

The tap may comprise at least one solenoid valve activated by the handle for dispensing a predetermined volume of the first or second liquid.

The first angle can be smaller than the second angle, and the second angle can be smaller than the third angle.

The value of the first angle can be comprised between 25° and 35°, preferably about 30°, the value of the second angle can be comprised between 40° and 50°, preferably 45°, and the value of the third angle can be comprised between 55° and 65°, preferably 60°.

In other examples of the present invention, the tap for dispensing a first liquid or a second liquid, may comprise:

- a first inlet that is arranged to be connected to a first pipe for inflowing said first liquid in the tap, and a second inlet that is arranged to be connected to a second pipe for inflowing said second liquid in the tap;
- a first outlet for outflowing said first liquid and a second outlet for outflowing said second liquid from the tap,
- a handle for controlling the flow of the first and/or second liquid through the first and/or second outlet, wherein the handle is able to rotate around a centre point so as to be placed alternatively in:
- a first open position corresponding to a rotation of the handle of a first angle ($\alpha_1$) with respect to a vertical reference axis passing through said centre point, said first open position allowing the first liquid to flow out through the first outlet, or in;
- a closed position corresponding to a rotation of the handle of a second angle ($\alpha_2$) with respect to said reference axis, said closed position preventing the first or second liquid to flow out from the first and second outlets, or in;
- a second open position corresponding to a rotation of the handle of a third angle ($\alpha_3$) with respect to said reference axis, said second open position allowing the second liquid to flow out through the second outlet, wherein the first angle $\alpha_1$ is smaller than the second angle ($\alpha_2$), and wherein the second angle ($\alpha_2$) is smaller than the third angle ($\alpha_3$).

The value of the first angle ($\alpha_1$) can be comprised between 25° and 35°, preferably about 30°, the value of the second angle ($\alpha_2$) can be comprised between 40° and 50°, preferably 45°, and the value of the third angle ($\alpha_3$) can be comprised between 55° and 65°, preferably 60°.

The tap may further comprise:

- a first chamber which is in fluid communication with the first inlet and with the first outlet, and;
- a first piston disposed in the first chamber, the first piston being able to move along a first piston axis between a first hermetic position obstructing the first outlet preventing the first liquid to flow out of the first outlet, and a first flowing position liberating the first outlet allowing the first liquid to flow out of the first outlet, in response to a first movement of the handle, and;
- a second chamber in fluid communication with the second inlet and with the second outlet, and;
- a second piston disposed in the second chamber, the second piston being able to move along a second piston axis between a second hermetic position obstructing the second outlet preventing the second liquid to flow out of the second outlet and a second flowing position liberating the second outlet allowing the second liquid to flow out of the second outlet, in response to a second movement of the handle, wherein the first and second hermetic positions of the first and second pistons correspond to said closed position of the handle, and;

wherein the first flowing position of the first piston corresponds to said first open position of the handle, and;

wherein the second flowing position of the second piston corresponds to said second open position of the handle.

The tap may further comprise a toggle mechanism relating the handle to the first and second piston, the toggle mechanism allowing to convert a rotation of the handle into a linear movement of the first and/or second piston.

The tap may further comprise a first lower O-ring and a second upper O-ring that are mounted on the first piston, the first lower O-ring being disposed so as to hermetically obstruct the first outlet when the handle is in the second position, and the first upper O-ring being disposed so as to prevent the first liquid to reach a handle mechanism, and further comprising a second lower O-ring and a second upper O-ring that are mounted on the second piston, the second lower O-ring being disposed so as to hermetically obstruct the second outlet when the handle is in the second position, and the second upper O-ring being disposed so as to prevent the second liquid to reach the handle mechanism.

A first lower external diameter of the first lower O-ring and a first upper external diameter of the first upper O-ring may be equal, and/or wherein a second lower external diameter of the second lower O-ring and a second upper external diameter of the second upper O-ring may be equal.

The tap may further comprise:

a first spring that is coiled up around a first portion of said first piston, and a second spring that is coiled up around a second portion of said second piston, wherein said first spring is compressed when the handle is moved from the close position to the first open position, and wherein said second spring is compressed when the handle is moved from the close position to the second open position.

The tap may further comprise at least one solenoid valve activated by the handle for dispensing a predetermined volume of the first or second liquid.

The tap may further comprise a tap nozzle that comprises:

a nozzle chamber;

at least one nozzle inlet in fluid communication with the nozzle chamber, the nozzle inlet being arranged to be connected to a tap outlet for allowing at least one liquid to flow from the tap outlet into the nozzle chamber;

a paddle wheel in the nozzle chamber, the paddle wheel being able to rotate in a plane perpendicular to a flow axis determined by the flow of the liquid in the nozzle chamber, a rotation of the paddle wheel being caused by the flow of the liquid through the paddle wheel;

a nozzle outlet in fluid communication with the nozzle chamber for allowing the at least one liquid to flow out the tap nozzle;

a planar grid disposed in the nozzle chamber between the paddle wheel and the nozzle outlet in a plane perpendicular to the flow axis, wherein a diameter of the paddle wheel and a diameter of the planar grid are smaller than a diameter the nozzle chamber so as to allow the pressure differential caused by the liquid flow in the nozzle chamber to make an air flow to circulate in between a nozzle chamber inner surface and a paddle wheel lateral outer surface and a planar grid lateral outer surface.

The tap may further comprise a funnel disposed between the planar grid and the nozzle outlet so that an aperture of the funnel having the largest diameter faces the planar grid and an opposite aperture of the funnel having the smallest diameter faces the nozzle outlet.

The tap may further comprise a liquid flow director disposed in the nozzle outlet for directing the liquid flowing out of the tap nozzle.

SHORT DESCRIPTION OF THE DRAWINGS

Exemplar embodiments of the invention are disclosed in the description and illustrated by the drawings in which.

EXAMPLES OF EMBODIMENTS OF THE PRESENT INVENTION

Figure 1:
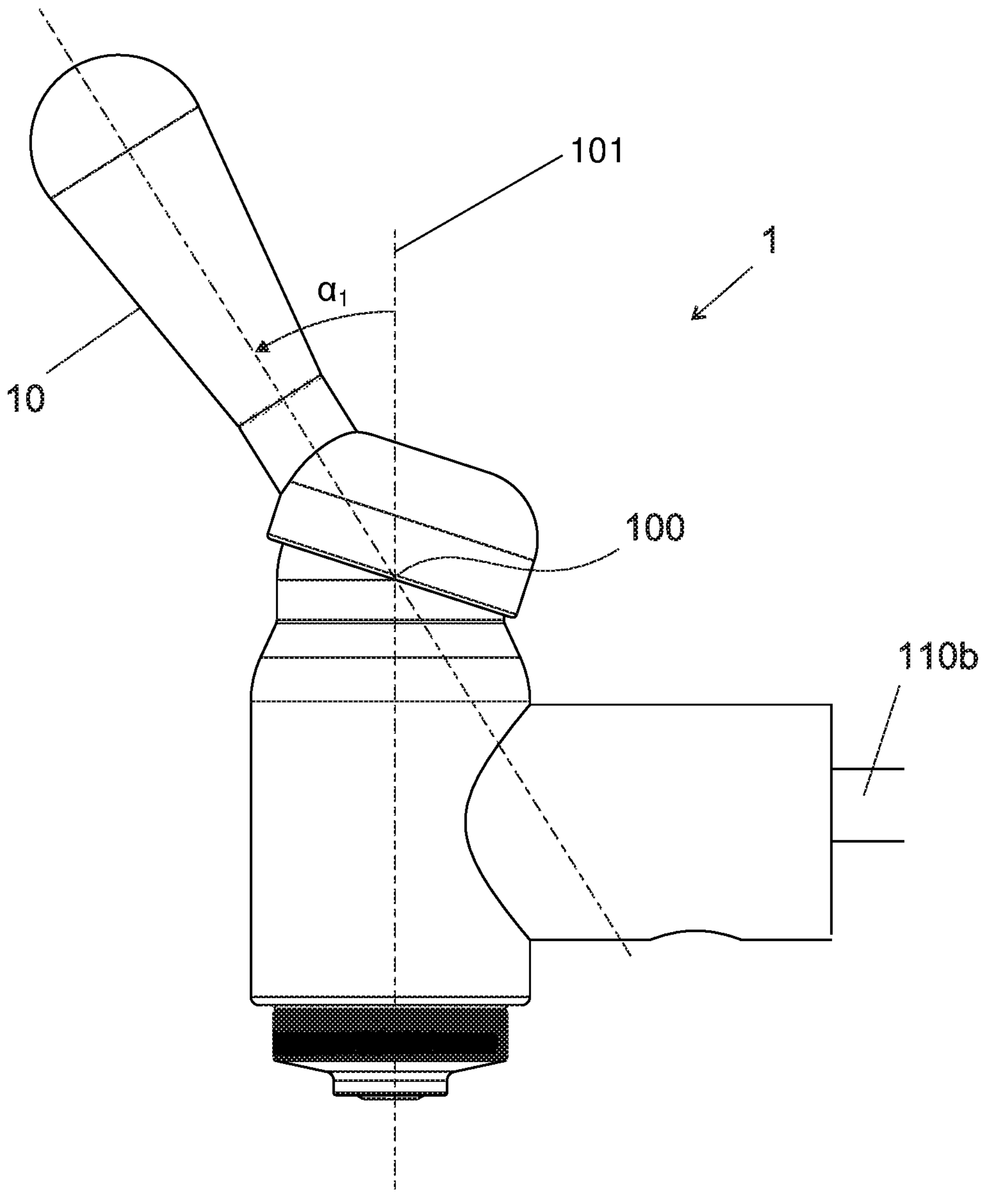
FIG. 1 illustrates a tap with a handle in a first open position.
Figure 2:
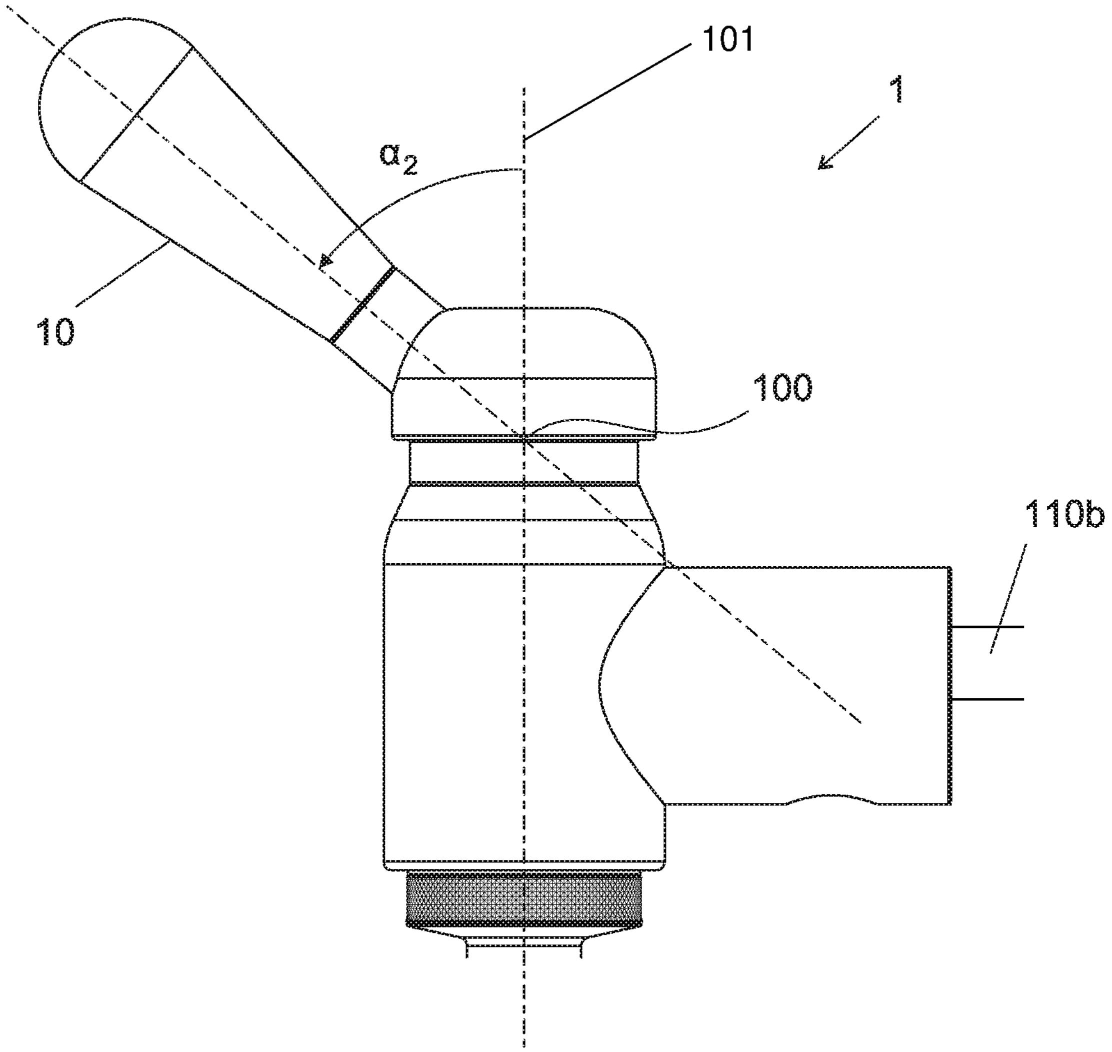
FIG. 2 illustrates a tap with a handle in a closed position.
Figure 3:
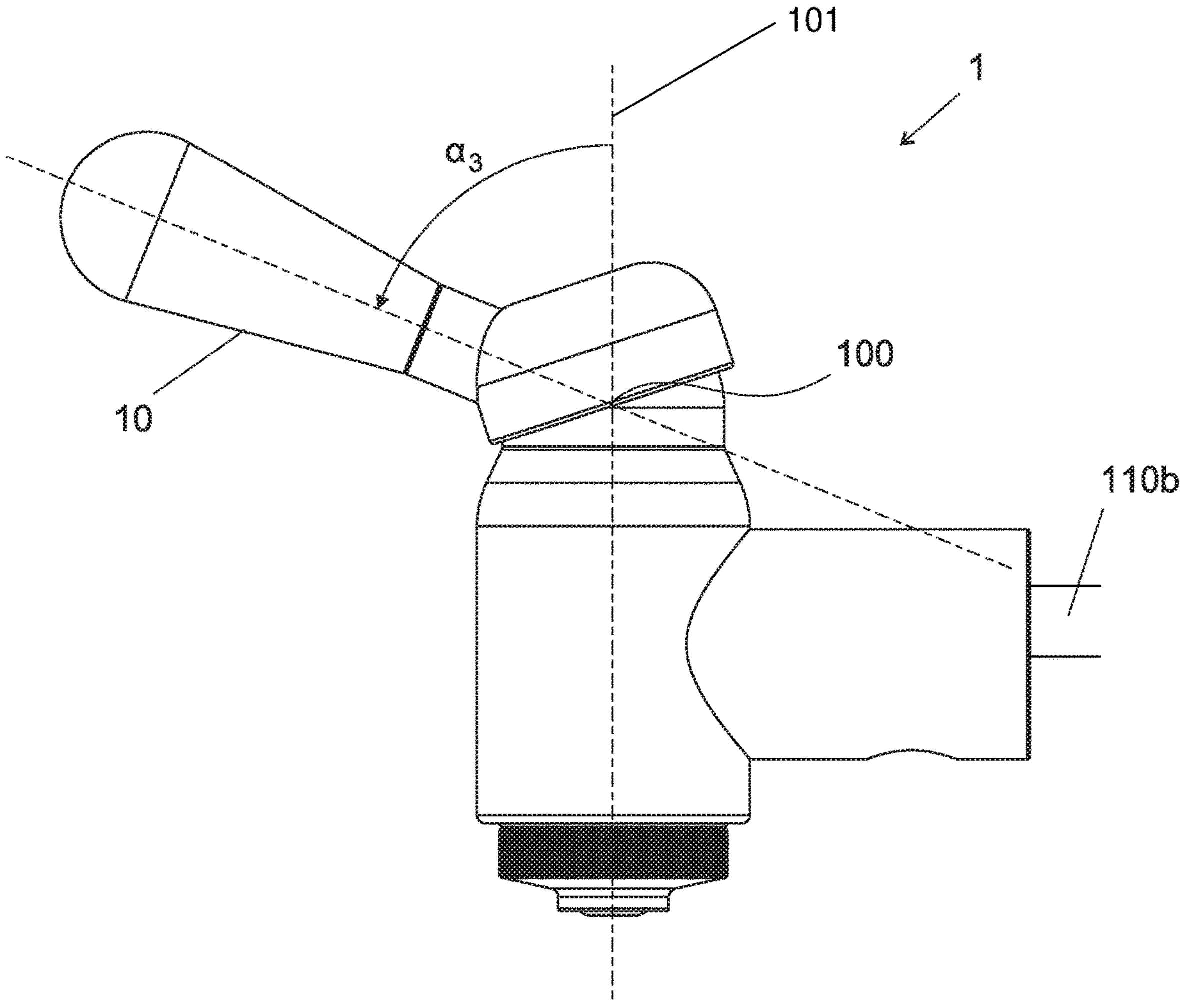
FIG. 3 illustrates a tap with a handle in a second open position.

FIGS. 1-3 illustrate a tap 1 for dispensing alternatively two liquids such as for example still and sparkling water, or chilled and ambient water. Although this disclosure refers sometimes to water for brevity, it is intended that the present embodiments may be configured or intended for dispensing any type of beverages, water-based or not, and more generally, any type of liquid.

The two liquids that are to be dispensed are brought to the tap via two separated pipes. In particular, the tap 1 comprises a first inlet 11*a* connected to a first pipe 110*a* which brings a first liquid into the tap, and a second inlet 11*b* connected to a second pipe 110*b* which brings a second liquid into the tap.

The first and second pipes may be connected to any type of liquid source such as for example a water distribution network, a dedicated beverage distribution network, any liquid tank, pressurized or not, such as a beer keg or an insulated chilled water tank.

The tap 1 also comprises a first outlet 12*a* for outflowing the first liquid, and a second outlet 12*b* for outflowing the second liquid.

A nozzle may be equipped on the first and second outlets of the tap so as to gather the flow of the first and second liquid into a single flowout. Other types of nozzles such as for example filter nozzles or water saving nozzles may be mounted on the tap.

The tap 1 comprises a handle 10 which can be placed by a user in three distinct positions corresponding to the three flowing states of the tap. The handle is moved by rotation around a centre point 100. This rotation is preferably operated in a vertical plane, but other configurations in which the handle is able to rotate in an arbitrary plane are not excluded. In the present disclosure, the term "vertical" refers to its commonly accepted definition when the tap is in working order.

In the embodiment illustrated in the FIGS. 1-3, the handle 10 is able to rotate around a centre point 100 and the rotation is operated in a vertical plane comprising a reference axis 101 which passes through the centre point. This configuration of the handle is meant to mimic the standard configuration of beer dispensers. The different positions of the handle correspond to different angles measured between the reference axis 101 and the handle in angular degrees.

In FIG. 1, the handle 10 of the tap 1 is placed in a first open position in which a first liquid can flow out of the tap and be dispensed. This first open position is determined by the angle $\alpha_1$ between the reference axis and the handle.

In FIG. 2, the handle 10 of the tap 1 is placed in a closed position in which no liquid can flow out of the tap. The closed position is determined by the angle $\alpha_2$ between the reference axis and the handle. The angle $\alpha_2$ is greater than $\alpha_1$ so that a user has to push the handle up to pass from the closed position to the first open position.

In FIG. 3, the handle 10 of the tap 1 is placed in a second open position in which a second liquid can flow out of the tap and be dispensed. This second open position is determined by the angle $\alpha_3$ between the reference axis and the handle. The angle $\alpha_3$ is greater than $\alpha_2$ so that a user has to push the handle down to pass from the closed to the second open position.

The first angle $\alpha_1$ may takes value between 25° and 35°, and preferably around 30°. The second angle $\alpha_2$, which is greater than the first angle, may take values between 40° and 50°, and preferably around 45°. The third angle $\alpha_3$, which is greater than the second angle, and therefore than the first angle, may take value between 55° and 65°, and preferably around 60°.

The tap 1 comprises a distribution unit whose purpose is to command the distribution of the first and second liquids in reaction to the movement of the handle 10. The distribution unit is arranged so that it provides the normally closed attribute to the tap. This means that in absence of external action on the handle, the first and second liquids are prevented from flowing out of the tap. Therefore, when no external force is applied on the handle, it spontaneously reaches the closed position. Hence if, after having used the tap to dispense the first or second liquid, a user does not place the handle back from the first or second open position in the closed position, the distribution unit will automatically make the handle reach the closed position.

Figure 4:
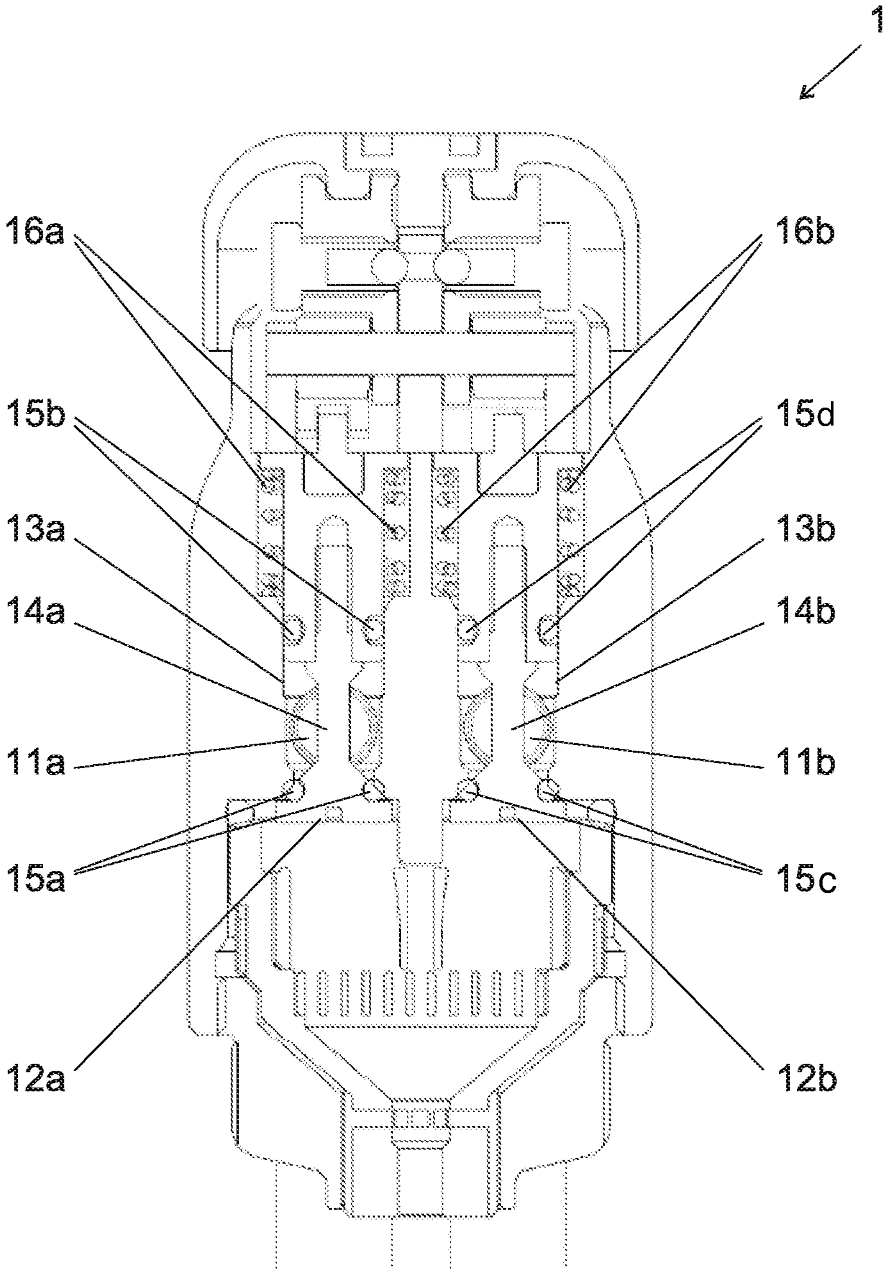
FIG. 4 illustrates a vertical cross section of a tap with two liquids inlets.

In an embodiment illustrated in FIG. 4, the distribution unit comprises a first and a second piston (14*a*, 14*b*). The first piston 14*a* commands the flow of the first liquid and the second piston 14*b* commands the flow of the second liquid. Both pistons are actuated by the handle 10 and can move between a flowing position and a hermetic position determined by the position of the handle.

When the handle is in the closed position, the first piston 14*a* obstructs the first outlet 12*a* and the second piston 14*b* obstructs the second outlet 12*b* so that neither the first nor the second liquid can flow out the tap.

When the handle 10 is placed in the first open position, the first piston 14*a* is pushed down so that the first liquid can flow out through the first outlet 12*a*, while the second piston 14*b* is not moved with respect to his position when the handle is in the closed position so that the second liquid is prevented from flowing through the second outlet 12*b*.

Similarly, when the handle 10 is placed in the second open position, the second piston 14*b* is pushed down so that the second liquid can flow out through the second outlet 12*b*, while the first piston 14*a* is not moved with respect to his position when the handle is in the closed position so that the first liquid is prevented from flowing through the first outlet 12*a*.

Figure 8:
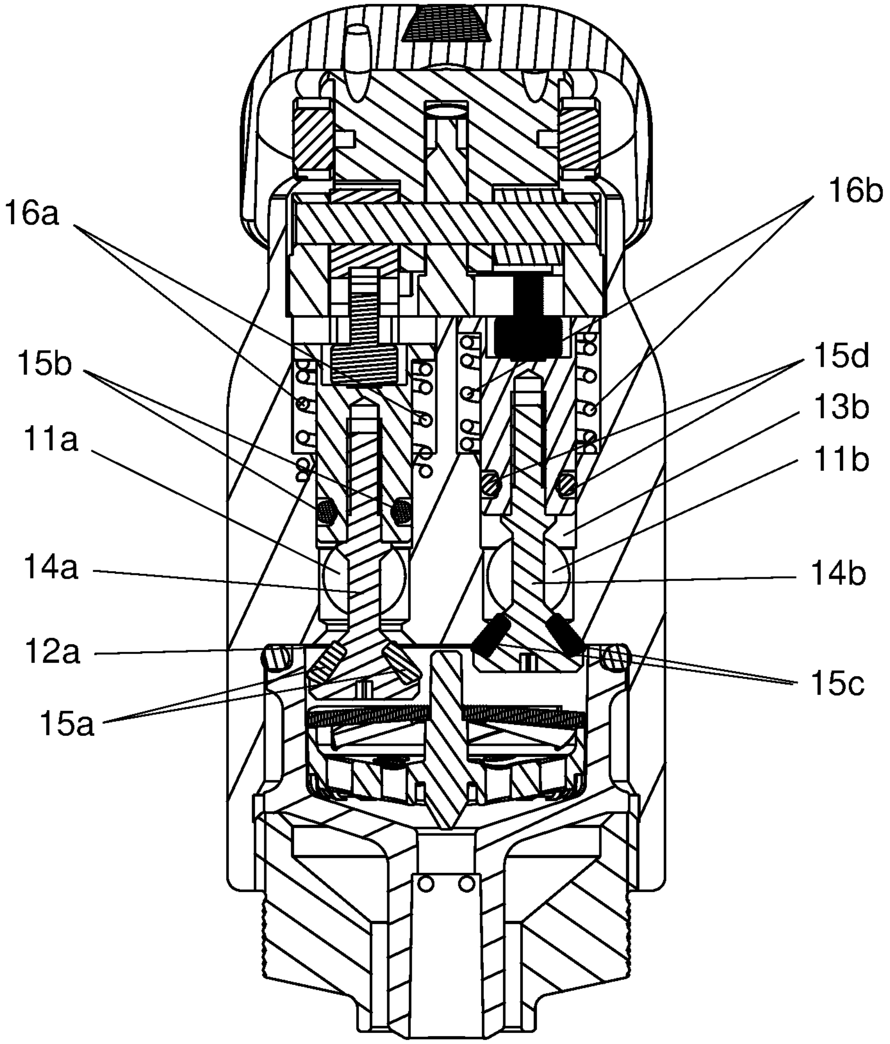
FIG. 8 illustrates a frontal cross section of a tap in a first open position.

The first and second pistons (14*a*, 14*b*) can be configured in such a way that the pressure applied by the first and second liquids against the first and second pistons contribute at least partially to the normally closed attribute of the tap. Indeed, as it can be seen on FIGS. 8-10, the first and second liquids flowing out respectively from the first and second inlets (110*a*, 110*b*) will exert a pressure on an internal upper surface and an internal lower surface of the pistons. These internal surfaces can be shaped and dimensioned so that when the handle 10 is in the closed position as in FIG. 9, the pressure exerted by the first liquid on the internal upper surface of the first piston compensates the pressure exerted on the internal lower surface of the first piston so that the first piston is maintained in its hermetic position. Therefore, the liquid pressure naturally maintains the tap closed. When the handle 10 is placed in the first open position the first piston 14*a* is in its flowing position as illustrated in FIG. 8, and the pressure of the first liquid against the internal upper surface of the first piston becomes greater that the pressure exerted against the internal lower surface, so that the piston tends to reach its hermetic position if no external force is applied on the handle, i.e. if the handle is released. The situation is similar on FIG. 10 in which the handle is placed in the second open position. If the handle is released, the pressure force differential exerted by the second liquid will make the second piston reach its hermetic position.

Figure 9:
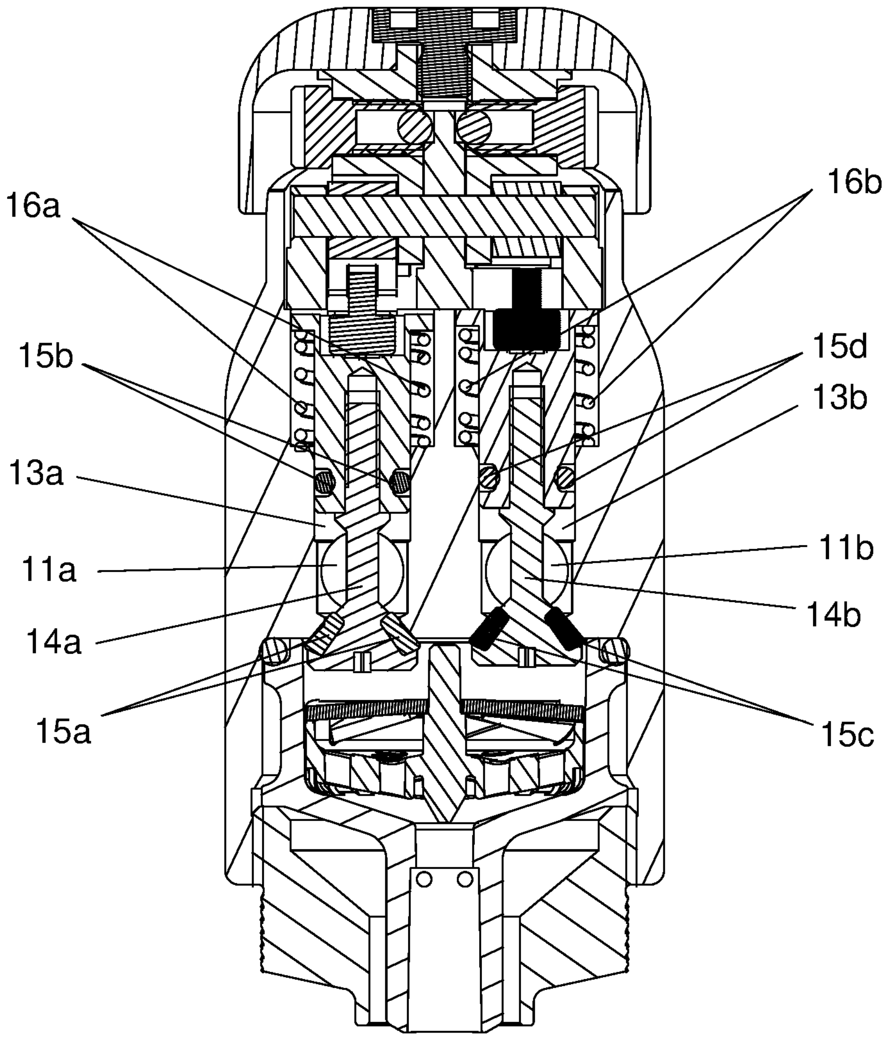
FIG. 9 illustrates a frontal cross section of a tap in a closed position.
Figure 10:
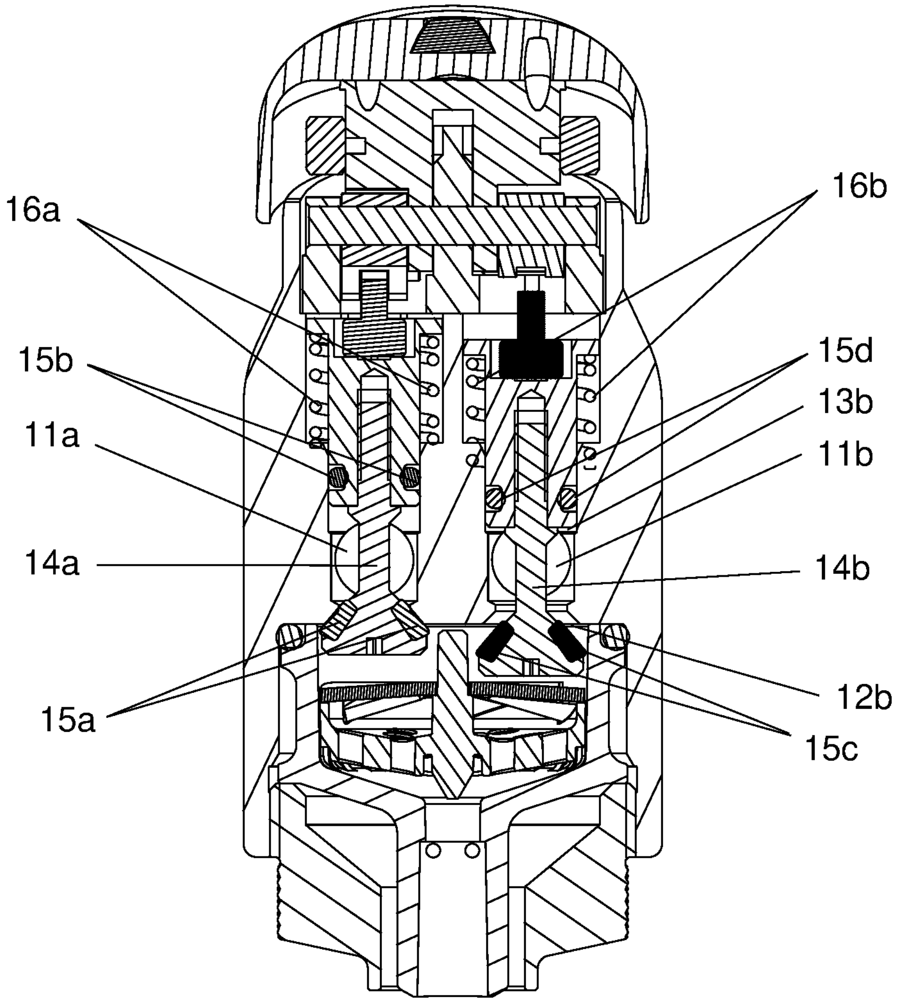
FIG. 10 illustrates a frontal cross section of a tap in a second open position.

For several reasons, including hygiene reasons or liquid temperature reasons, it may be important to prevent the first and the second liquid from mixing inside the tap. Therefore, as illustrated in FIG. 9, the first piston 14*a* can be disposed in a first chamber 13*a* and the second piston 14*b* in a second chamber 13*b*, the first chamber and the second chamber being devoid of fluid communication when the handle 10 is in the closed position.

The transmission of the handle movement to the first and second piston can be made by a toggle mechanism which allows a transformation of the rotation of the handle 10 around the centre point 100 into a linear movement of the two pistons. This toggle mechanism may comprise, for each of the first and second piston, an upper plate (17*a*, 17*b*) and a lower plate (18*a*, 18*b*) which are fixed together around a pivot (19*a*, 19*b*) forming therefore a double pendulum system.

Figure 6:
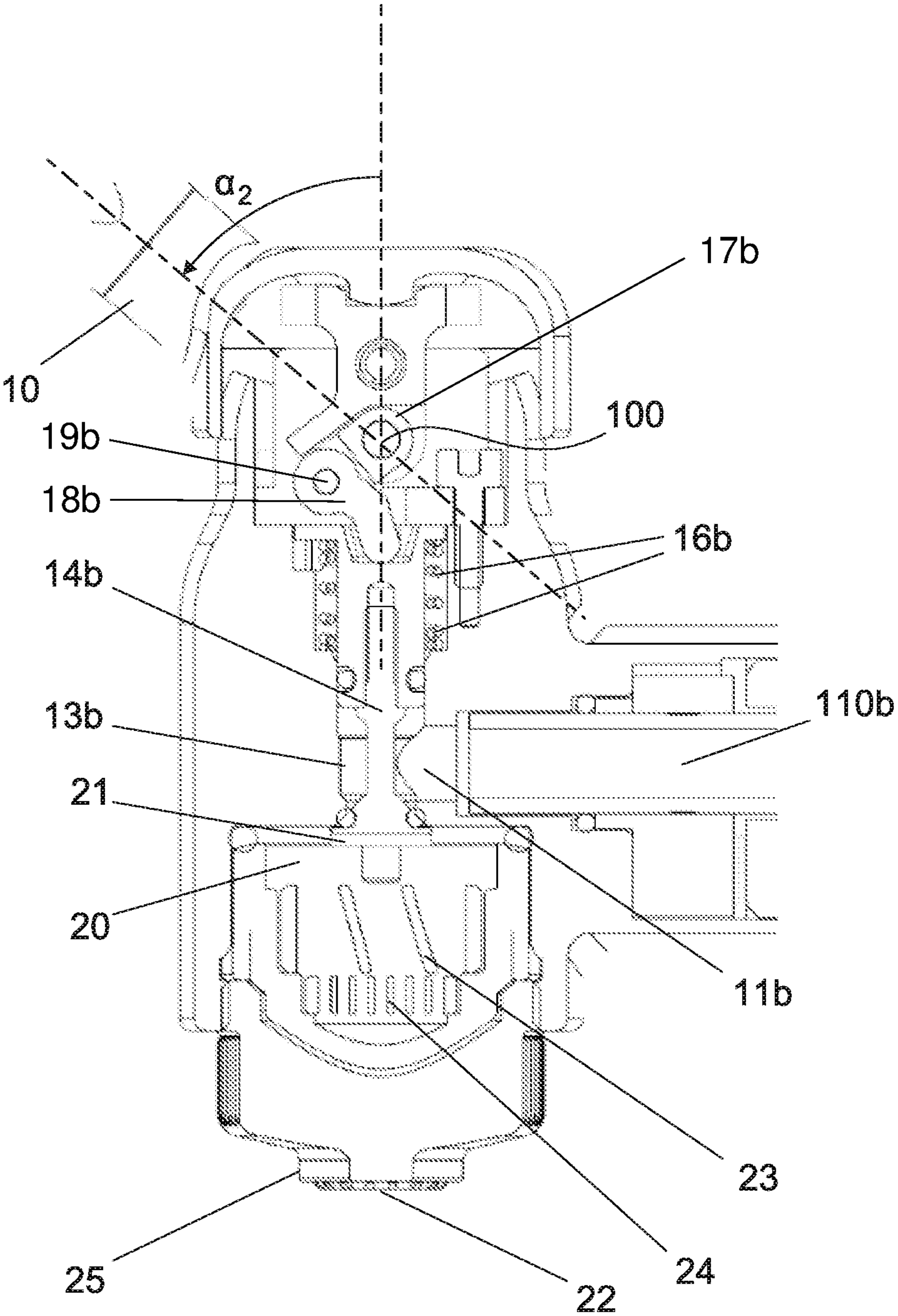
FIG. 6 illustrates a vertical eccentric cross section of a tap with a handle in a closed position.
Figure 7:
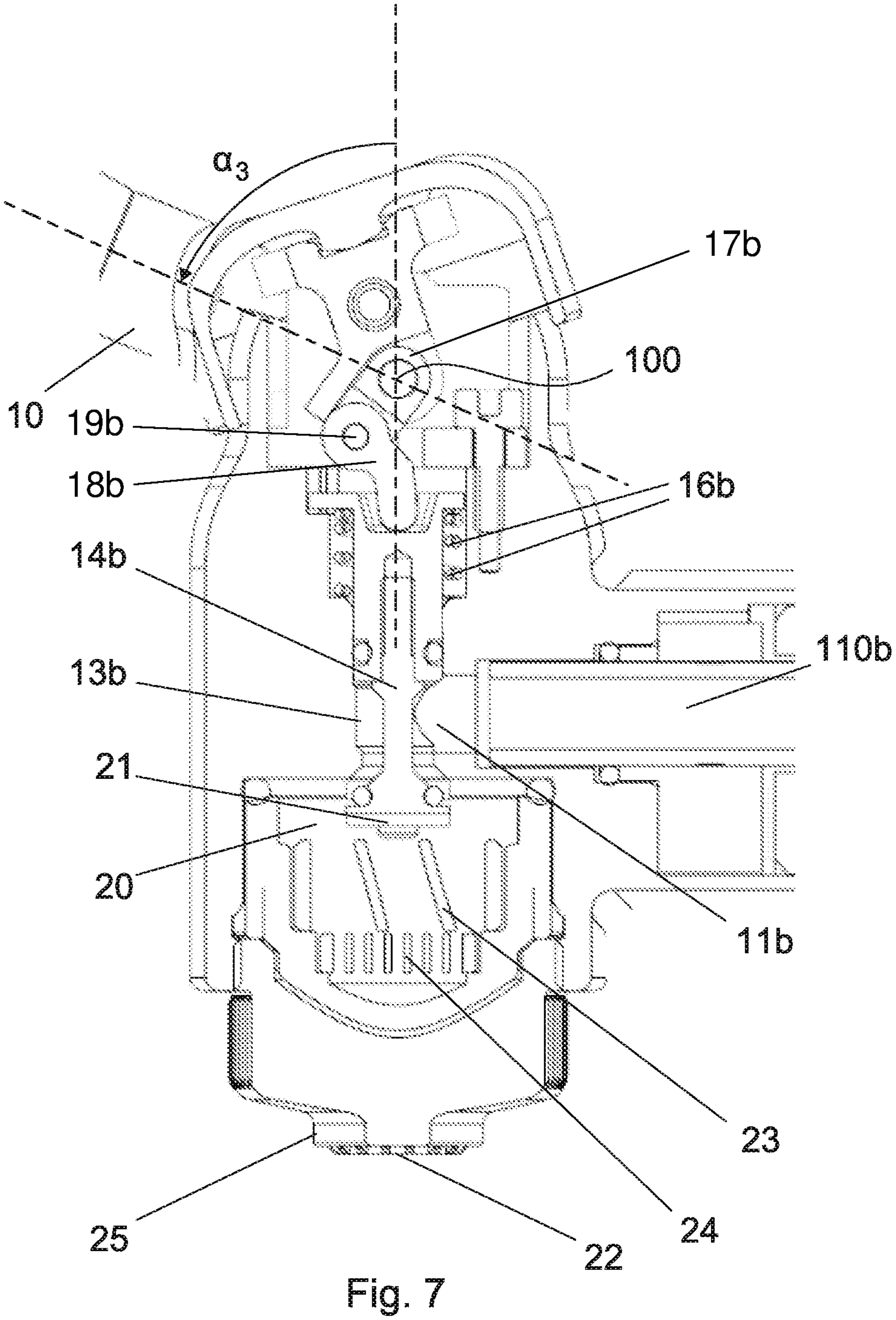
FIG. 7 illustrates the same vertical eccentric cross section as the one of FIG. 6 with the handle in the second open position.

The cross-views of FIGS. 6 and 7 illustrate the toggle mechanism associated to the pistons. Although the reference are only given for this second side of the tap, it shall be understood that the same is true for the other side of the tap (the side corresponding to the first piston). An extremity of the upper plate 17*b* is fixed around the centre point 100 and is in direct contact with a lever 102*b* which is rigidly fixed to the handle 10 so that a rotation of the handle around the centre point 100 is transferred to the upper plate 17*b* which also rotates around the centre point. Since the upper and lower plates (17*b*, 18*b*) are fixed together through the pivot 19*b*, the rotation of the upper plate around the centre point causes the lower plate 18*b* to move. In particular, the lower extremity of the lower plate has a vertical movement component. This lower extremity of the lower plate being disposed on the top of the second piston, the vertical movement component of the lower plate causes the second piston to move down and therefore to be placed in its flowing position.

Figure 11:
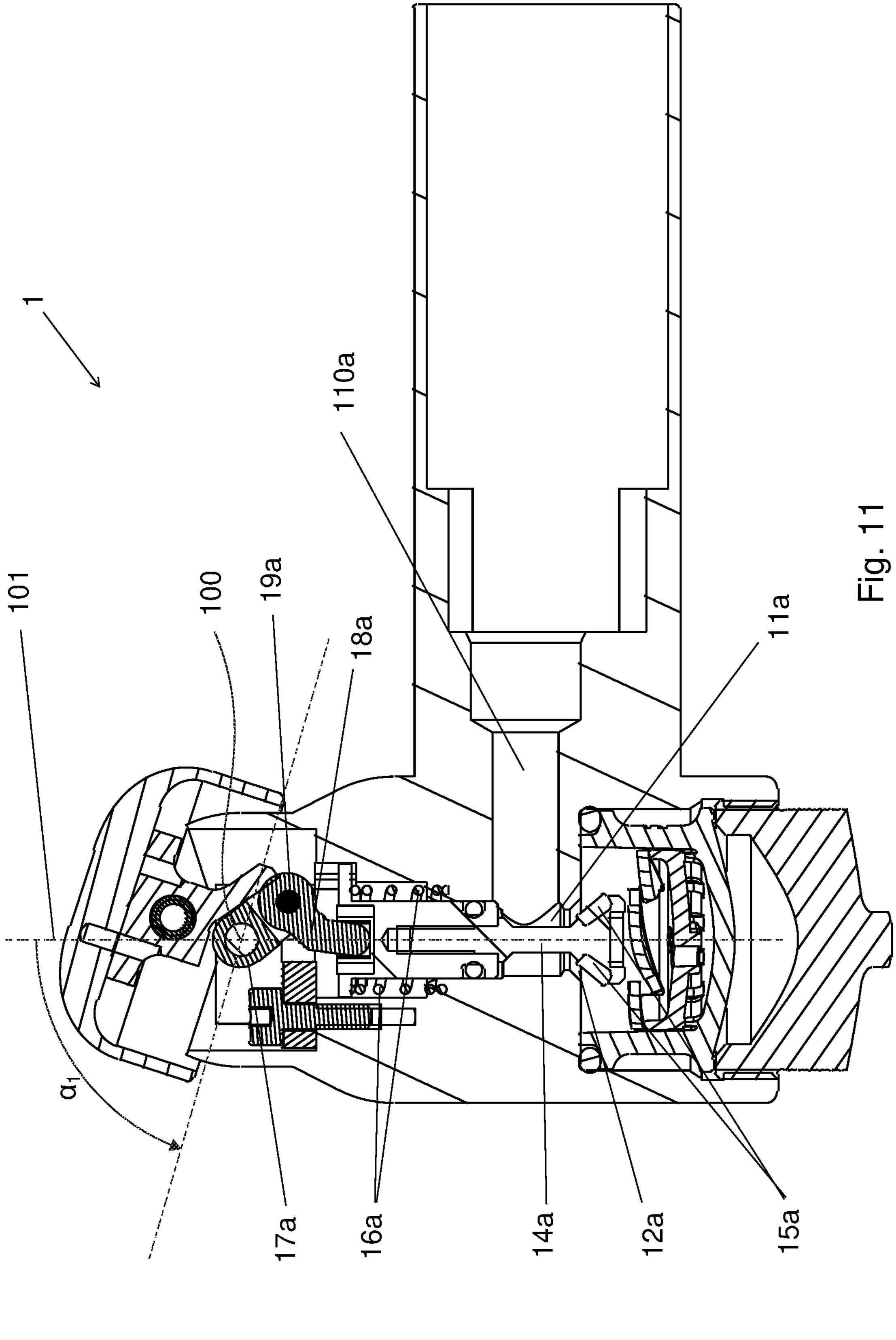
FIG. 11 illustrates a lateral cross section of a tap in the first open position.

FIG. 11 illustrates the toggle mechanism associated to the first piston 14*a*. As for the second piston, the upper plate 17*a* associated to the first piston is rotatably mounted around the centre point 100 and is in direct contact with a lever 102*a* which is rigidly fixed to the handle 10 so that a movement of the handle is converted into a rotation of the upper plate 17*a*. The lower plate 18*a* is also rotatably fixed to the upper plate 17*a* and is in direct contact with the top of the first piston so as to be able to transmit the movement of the handle to the first piston.

In the same way that a movement of the handle 10 is directly transferred to the first or second piston (14*a*, 14*b*) through the respective toggle mechanisms, a movement of the first or second piston is also directly transferred back to the handle. This allows the handle to spontaneously reach the closed position when the either the first or second piston reaches its hermetic position. Therefore, if the handle is released when it is in the first or second open position, the movement of the first or second piston will cause the handle to go back to the closed position.

Figure 12:
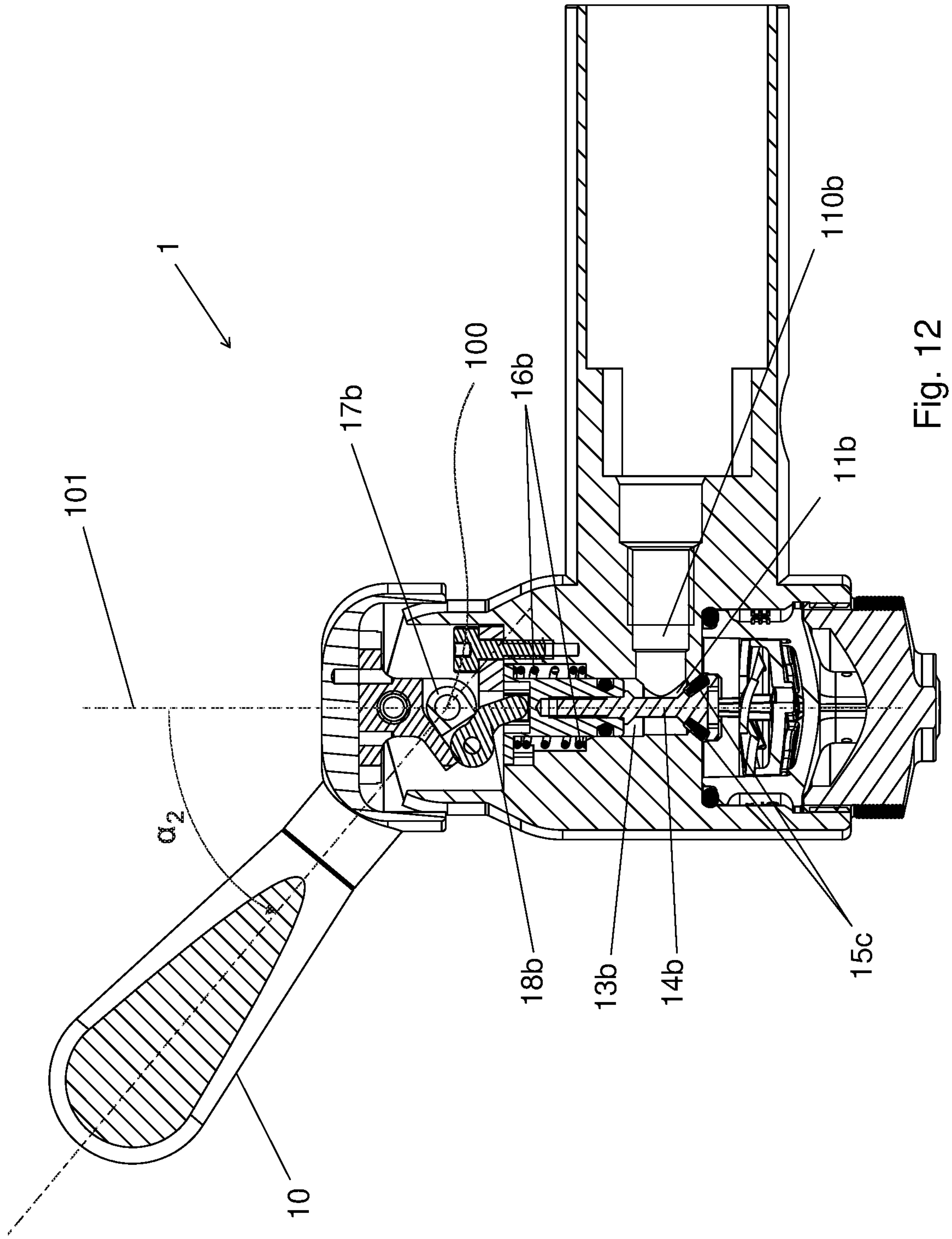
FIG. 12 illustrates a lateral cross section of a tap in the closed position.
Figure 13:
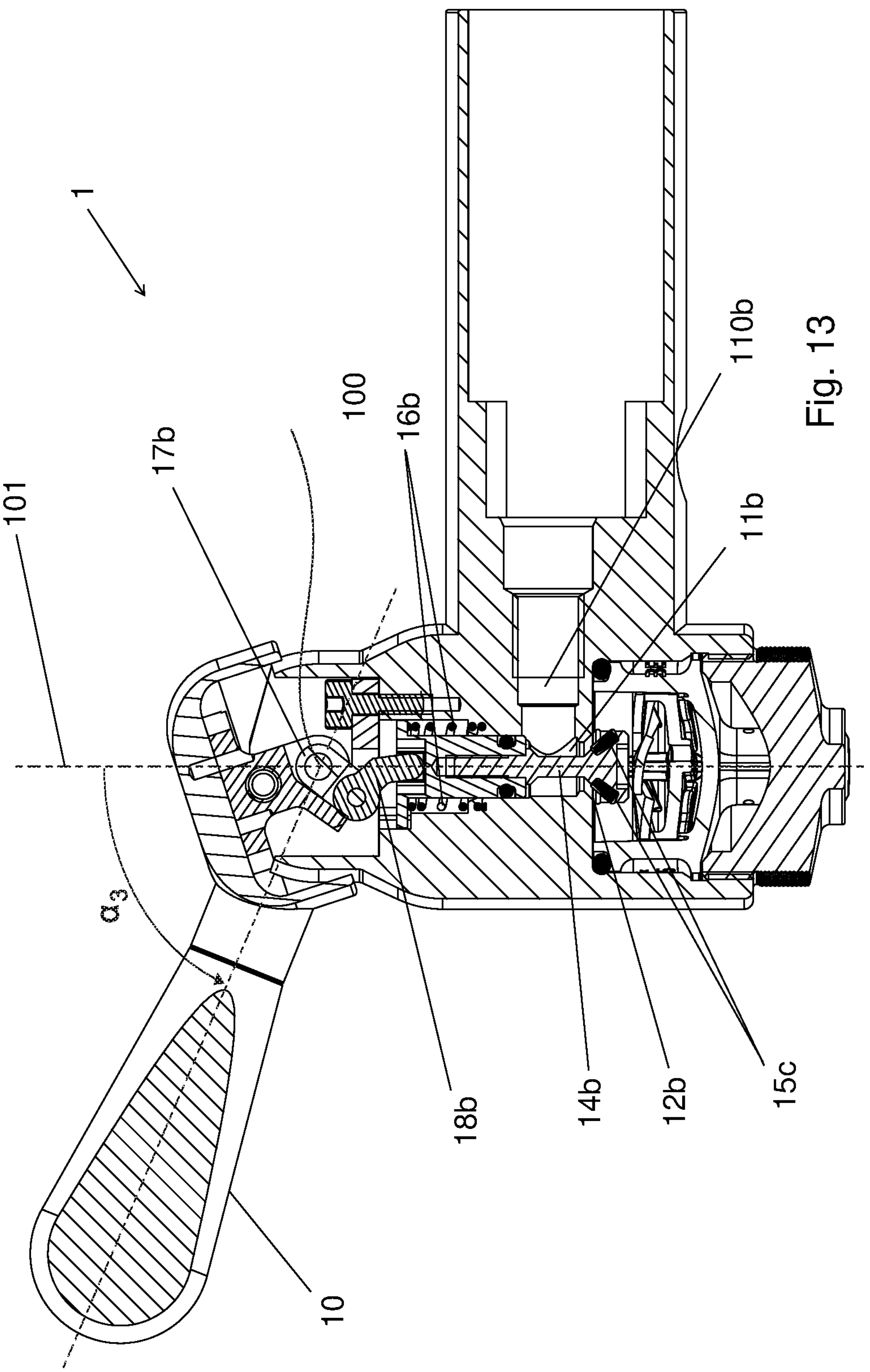
FIG. 13 illustrates a lateral cross section of a tap in the second open position.

As it can be seen from FIGS. 11 and 12, the upper and lower plates (17*a*, 18*a*) associated to the first piston 14*a* are in an anti-symmetric configuration with respect to the upper and lower plates (17*b*, 18*b*) associated to the second piston 14*b*. This configuration prevents that both pistons move when the handle 10 is moved. Indeed, this anti-symmetric configuration guarantees that when the handle is put in the first open position, the rotation of the handle only causes the upper plate associated to the first piston to rotate by its contact with the handle base, while the upper plate associated to the second piston is not in contact with the handle base and therefore does not move. Conversely, if the handle is put in the second open position, only the upper plate associated to the second piston is moved by the handle base.

Figure 5:
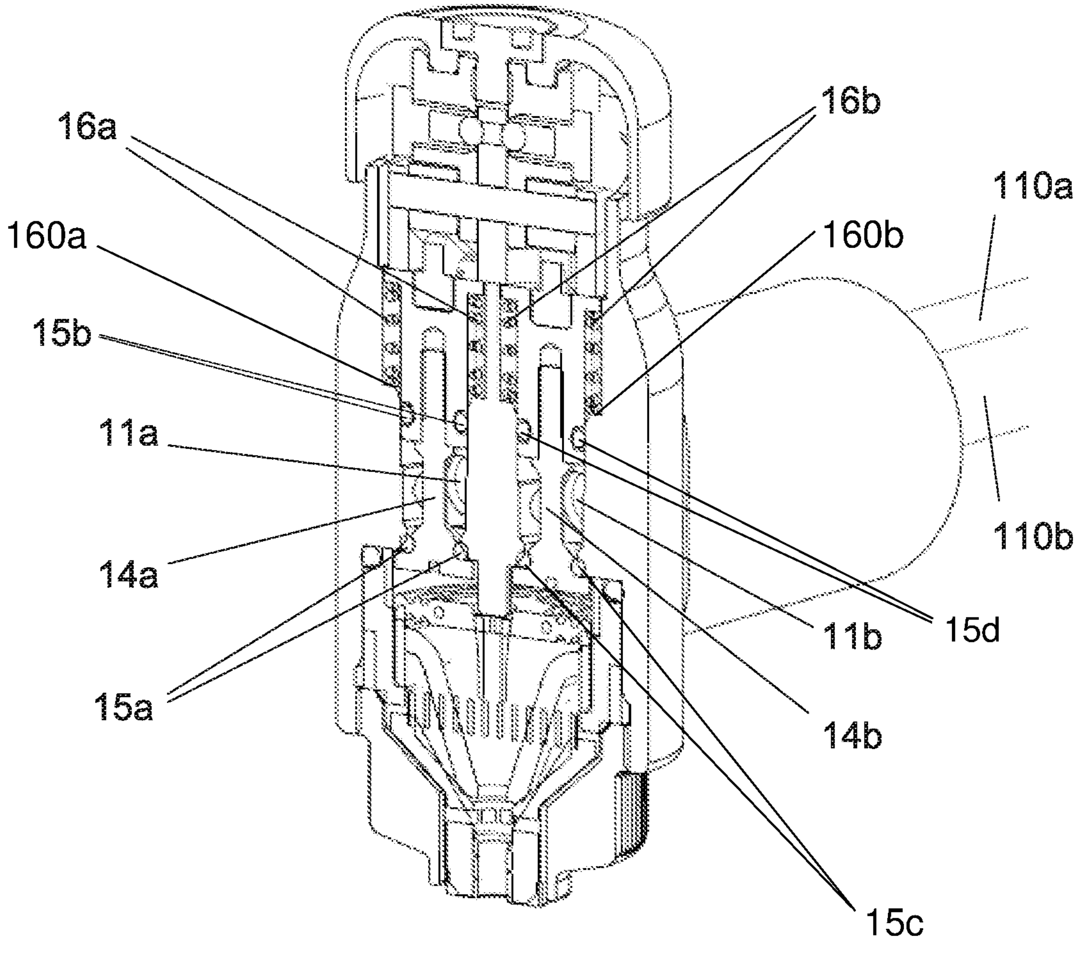
FIG. 5 illustrates a three quarter view of a vertical cross section of a tap with two liquids inlets.

In order to help the pistons to move back from their flowing positions to their hermetic positions the first and second pistons can be equipped with springs coiling around them. As illustrated in FIG. 5, a first spring 16*a* can be mounted around a first portion of the first piston 14*a* and a second spring can be mounted around a second portion of the second piston 14*b*.

In some embodiments, both the pressure differential of the liquids and the force exerted by the springs contribute to move the handle back to its closed position. This is typically the case if the pressure differential or the spring force taken individually cannot compensate the handle's weight.

The inner surface of the first chamber 13*a* has a first flange 160*a* on which the first spring 16*a* can be disposed so that when the first piston is moved down, the first spring is compressed between the upper part of the first piston and the first flange. Then, when the handle is placed back from the first open position to the closed position, the first piston is moved up by the first spring which tends to go back to its equilibrium position. Similarly, the inner surface of the second chamber 13*b* has a second flange 160*b* on which the second spring 16*b* can be disposed so that when the second piston is moved down, the second spring is compressed between the upper part of the second piston and the second flange. Then, when the handle is placed back from the second open position to the closed position, the second piston is moved up by the second spring which tends to go back to its equilibrium position.

The rigidity of the first and second spring may be sufficient to permit to the handle to pass from the first or second open position to the closed position, without the intervention of a user.

The sealing of the first and second chamber of the tap can be guaranteed by two pairs of O-rings equipped on the two pistons. As illustrated in FIG. 4, the first piston 14*a* can be equipped with a first lower O-ring 15*a* which hermetically close the first outlet 12*a* when the first piston is in the position corresponding to the closed position of the handle. Similarly, the second piston 14*b* can be equipped with a second lower O-ring 15*c* which hermetically close the second outlet 12*b* when the second piston is in the position corresponding to the closed position of the handle.

In addition to the two lower O-rings (15*a*, 15*c*), a first upper O-ring 15*b* can be equipped on the first piston 14*a* in order to prevent the first liquid from entering in the handle mechanism. Similarly, a second upper O-ring 15*d* can be equipped on the second piston 14*b* in order to prevent the second liquid from entering in the handle mechanism.

In a particular embodiment, the external diameters of the first lower O-ring and first upper O-ring are equal. As a consequence of this configuration, when the handle is in the closed position, the pressure applied by the first liquid in the direction of the first lower O-ring is compensated by the pressure applied in the direction of the first upper O-ring. This prevents the first piston to be in an unstable equilibrium when the handle is in the closed position. Similarly, the external diameters of the second lower O-ring and second upper O-ring are equal. As a consequence of this configuration, when the handle is in the closed position, the pressure applied by the second liquid in the direction of the second lower O-ring is compensated by the pressure applied in the direction of the second upper O-ring. This prevents the second piston to be in an unstable equilibrium when the handle is in the closed position.

The geometries of the different O-rings, and particularly the surface of the O-rings that is in contact with the first and second chamber, depend on the particular shape of the first and second pistons and can be adapted so that the pressure differential ensures that the handle 10 will reach its closed position when no external force is applied.

As illustrated in FIG. 4, the section of the different O-rings can be circular (i.e. a toric ring), but in alternative or complementary embodiments, this section can have any other suitable geometrical profile. For example, the section can be rectangular, as the lower O-rings illustrated in FIG. 8 or ellipsoidal.

When the handle is in the first open position, the pressure in the first chamber is usually at an intermediate value between the atmospheric pressure and the pressure in the first pipe. Similarly, when the handle is in the second open position, the pressure in the second chamber is usually at an intermediate value between the atmospheric pressure and the pressure in the second pipe.

In an embodiment, the tap may also comprise one or more solenoid valve activated by the handle for dispensing a predetermined volume of the first or second liquid. Such valves may be disposed in the first and/or second outlet so that only a predetermined amount of the first and/or second liquid can flow in the first and second chambers. Alternatively, the valves could be placed in the first and/or second outlet so that only a predetermined amount of the first and/or second liquid can flow out of the tap.

As already mentioned above, the tap 1 can be equipped with different types of nozzles according to the needs of the user. In particular, the tap can be equipped with an oxygenation nozzle whose purpose is to increase the aeration of the first and second liquids when they flow out of the tap.

Figure 14:
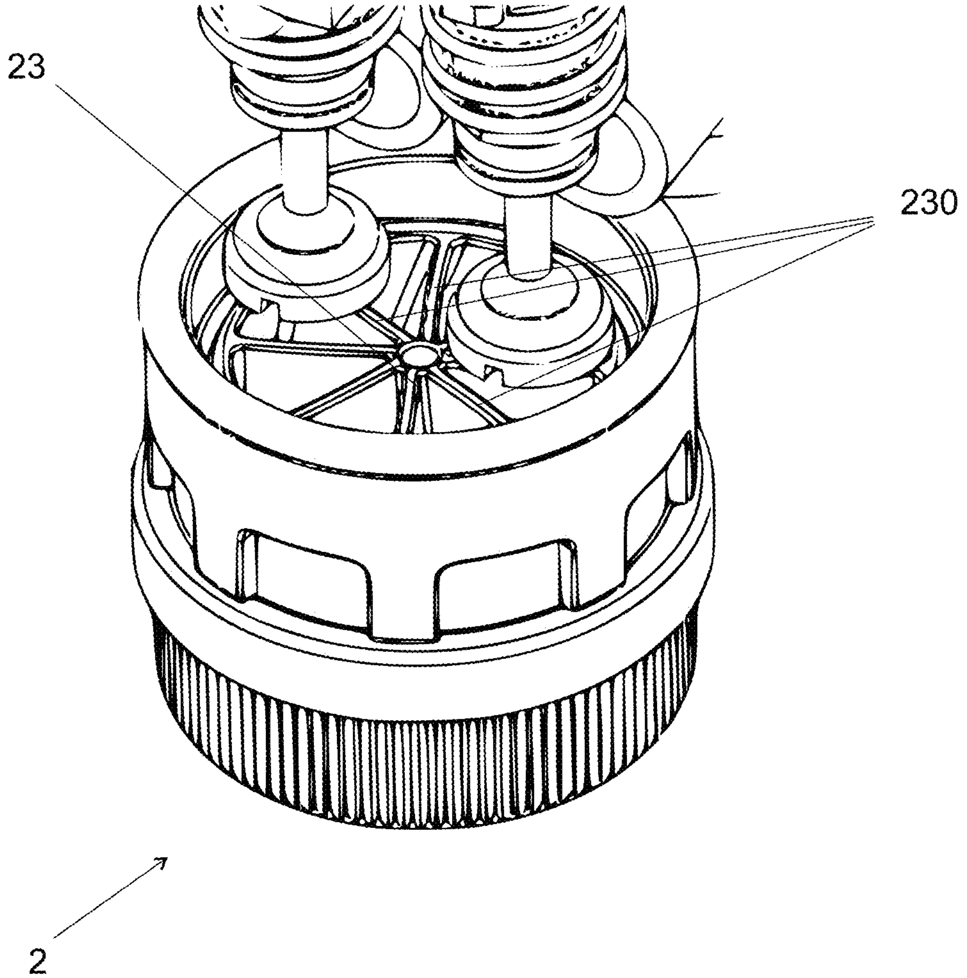
FIG. 14 illustrates a perspective view of a tap nozzle for aerating at least one liquid.
Figure 15:
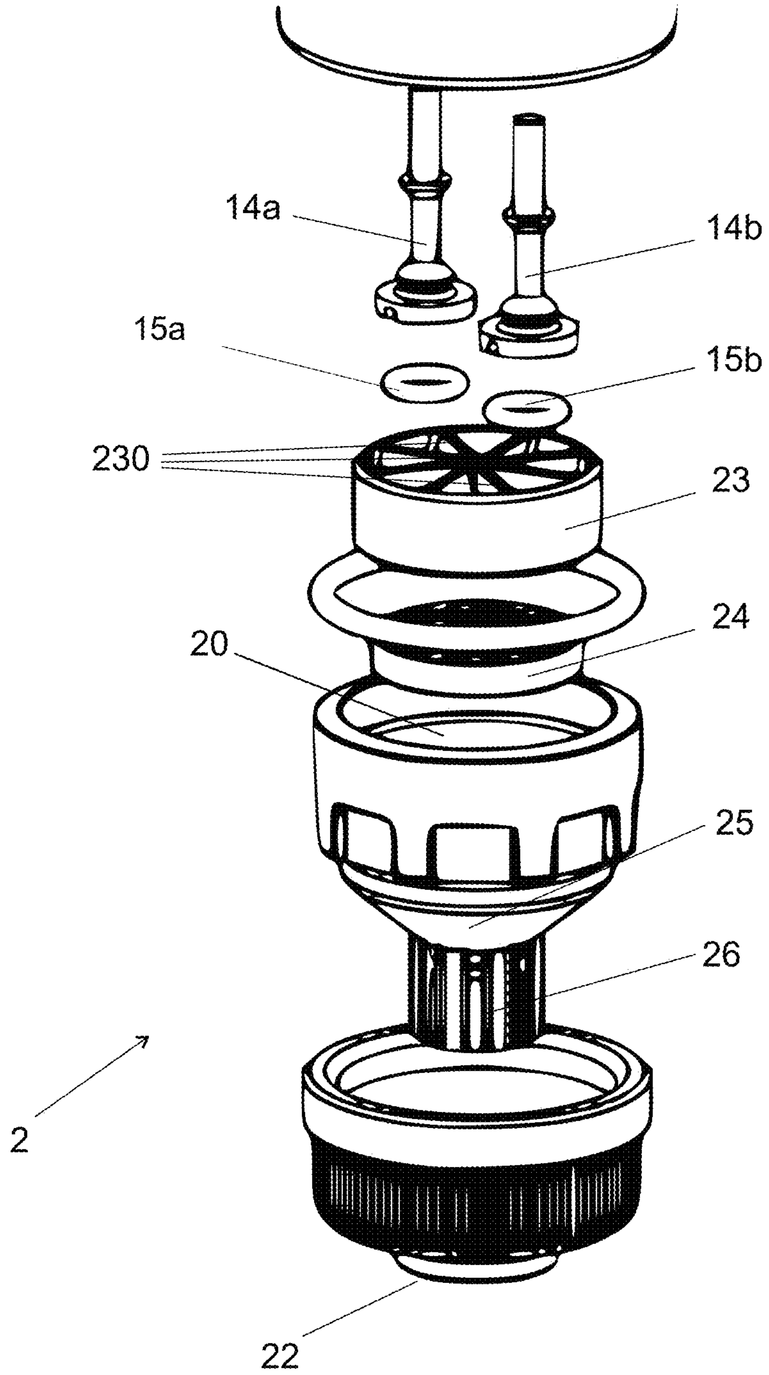
FIG. 15 illustrates an exploded view of a tap nozzle for aerating at least one liquid.
Figure 16:
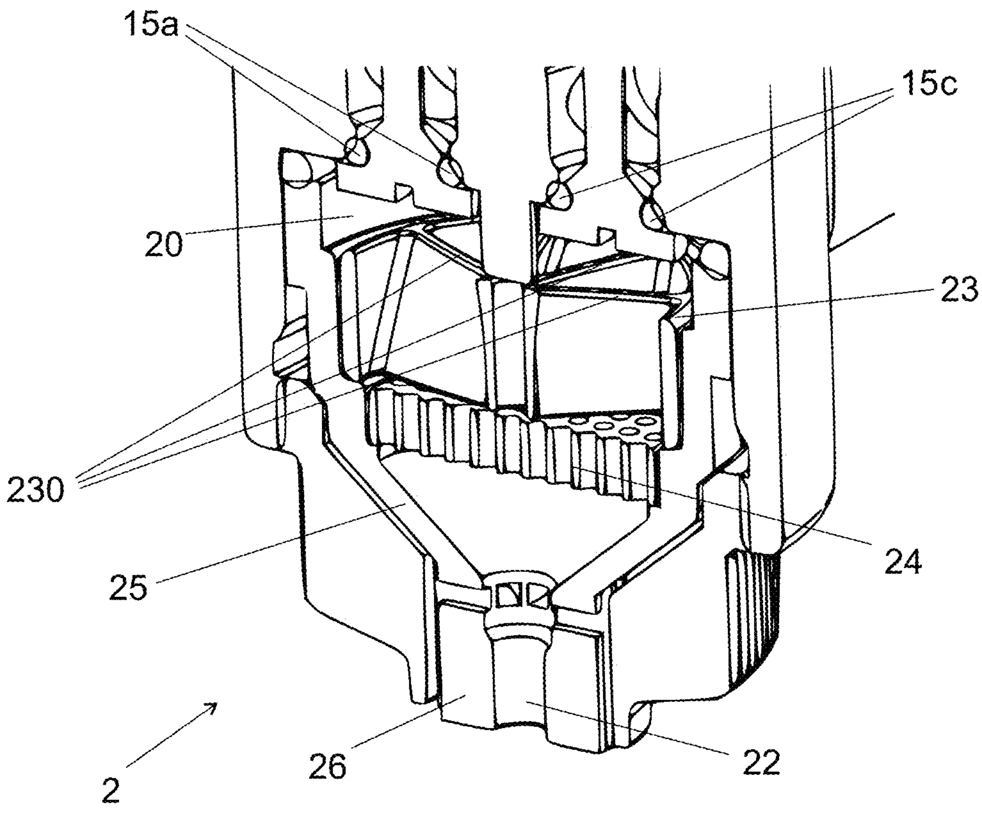
FIG. 16 illustrates a cross-sectional view of a tap nozzle for aerating at least one liquid.

Perspective, exploded and cross-sectional views of a tap nozzle 2 for aerating at least one liquid are respectively illustrated in FIGS. 14, 15 and 16. The tap nozzle comprises a nozzle chamber 20 which is in fluid communication with a nozzle inlet 21 adapted to be fixed on a tap. In the case of a tap as described above with a first and a second outlet, the nozzle inlet can be mounted so that both the first and second outlet are put in fluid communication with the nozzle inlet.

The tap nozzle 2 also comprises a nozzle outlet 22 which is in fluid communication with the nozzle chamber 20 and which allows a liquid in the nozzle chamber to flow out.

The nozzle chamber 20 is equipped with an aeration mechanism for maximizing the contact between the liquid flowing through the nozzle and air.

As illustrated in FIG. 16, this aeration mechanism comprises a paddle wheel 23 and a planar grid 24 that are disposed consecutively. The purpose of the paddle wheel is to maximize the liquid oxygenation by increasing the contact surface between the liquid and an air flow in the nozzle chamber. The planar grid 24 first ensures that bubbles in the liquid having a diameter superior to the holes in the grid are broken, and secondly further maximize the exchange surface between the liquid and the air.

The paddle wheel 23 is able to rotate in a plane which is perpendicular to a flow axis determined by the flow of liquid in the nozzle chamber. As illustrated in FIG. 14, the paddle wheel comprises a plurality of slanting fins 230 extending radially from the flow axis so that the rotation of the paddle wheel is caused by the flow of the liquid going through these slanting fins in the manner of a turbine.

The planar grid 24 is disposed between the paddle wheel 23 and the nozzle outlet 22, in a plane parallel to the plane in which the paddle wheel rotates so that the paddle wheel and the planar grid are parallel. The planar grid comprises a plurality of holes whose diameters may vary or not.

In order to allow an air flow to circulate around the aeration mechanism, the diameters of the paddle wheel 23 and of the planar grid 24 are smaller than the internal diameter of the nozzle chamber 20. The space between the inner surface of the nozzle chamber and the lateral surfaces of the paddle wheel and the planar grid created by this difference of diameters permits a circulation of an air flow which is in contact with the liquid at the level of the paddle wheel.

In order to create a venturi effect increasing the amount of air entering into the paddle wheel 23, the tap nozzle 2 may further comprise a funnel 25 disposed between the planar grid 24 and the nozzle outlet 22, as illustrated in FIG. 15. The funnel is oriented so that its aperture with the largest diameter faces towards the planar grid and its aperture with the smallest diameter faces towards the nozzle outlet. Due to the decreasing section of the funnel 25, the pressure is lower at the end of the funnel (i.e. at the aperture with the smallest diameter) than at its entrance (i.e. at the aperture with the largest diameter), so that the liquid and the air that are above the funnel tend to be sucked up into the funnel. This depression naturally maintain the air flow entering into the paddle wheel.

As illustrated in FIGS. 15 and 16, the tap nozzle 2 may also comprise a liquid flow director 26 disposed in the nozzle outlet for directing the liquid flowing out of the tap nozzle.

The tap nozzle 2 may be adapted to almost any tap type and is not restricted to the tap described above. In particular, the tap nozzle can be equipped on standard domestic water taps or professional taps dispensing a one or more liquids.

List of reference numerals

| | | | |
|---|---|---|---|
| 1 | Tap | 16a | First spring |
| 10 | Handle | 16b | Second spring |
| 100 | Centre point | 160a | First flange |
| 101 | Reference vertical axis | 160b | Second flange |
| 102a | First lever | 17a | First upper plate |
| 102b | Second lever | 17b | Second upper plate |
| 11a | First inlet | 18a | First lower plate |
| 11b | Second inlet | 18b | Second lower plate |
| 110a | First pipe | 19a | First pivot |
| 110b | Second pipe | 19b | Second pivot |
| 12a | First outlet | 2 | Tap nozzle |
| 12b | Second outlet | 20 | Nozzle chamber |
| 13a | First chamber | 21 | Nozzle inlet |
| 13b | Second chamber | 22 | Nozzle outlet |
| 14a | First piston | 23 | Paddle wheel |
| 14b | Second piston | 230 | Slanting fin |
| 15a | First upper O-ring | 24 | Planar grid |
| 15b | First lower O-ring | 25 | Funnel |
| 15c | Second upper O-ring | 26 | Liquid flow director |
| 15d | Second lower O-ring | | |

The invention claimed is:

1. A tap adapted for dispensing a first liquid and/or a second liquid, the tap comprising:

a first inlet and a second inlet;

a first outlet and a second outlet a handle-adapted to rotate around a centre point-so as to be placed alternatively in:

a first open position corresponding to a rotation of the handle of a first angle with respect to a vertical reference axis-passing through said centre point, or in;

a closed position corresponding to a rotation of the handle of a second angle with respect to said reference axis, or in;

a second open position corresponding to a rotation of the handle of a third angle with respect to said reference axis, wherein said first liquid flows through the first inlet and the first outlet when the handle is at its first open position, wherein said second liquid flows through the second inlet and second outlet when the handle is at is second open position and wherein both first and second liquids are prevented from flowing when the handle is at its closed position, and wherein the tap comprises a distribution unit, said distribution unit being arranged so as to allow said handle to spontaneously reach said closed position in absence of external action, wherein said distribution unit comprises a first piston and a second piston, the first piston being able to move between a first flowing position liberating the first outlet allowing the first liquid to flow out of the first outlet when the handle is in the first open position, and a first hermetic position obstructing the first outlet preventing the first liquid to flow out of the first outlet when the handle is in the closed or second open position, and the second piston being able to move between a second flowing position liberating the second outlet allowing the second liquid to flow out of the second outlet when the handle is in the second open position, and a second hermetic position obstructing the second outlet preventing the second liquid to flow out of the second outlet when the handle is in the closed or first open position, wherein said first and/or second piston are configured so that, when the handle is the closed position, the pressure applied by the first liquid on a first upper surface of the first piston compensates the pressure applied by the first liquid on a first lower surface of the first piston, and so that the pressure applied by the second liquid on a second upper surface of the second piston compensates the pressure applied by the second liquid on a second lower surface of the second piston.

2. Tap according to claim 1, wherein the first piston is disposed in a first chamber and the second piston is disposed in a second chamber, the first chamber and the second chamber being devoid of fluid communication when the handle is in the closed position.

3. Tap according to claim 1, wherein the distribution unit further comprises a first toggle mechanism relating the handle to the first piston and a second toggle mechanism relating the handle to the second piston, the first and second toggle mechanisms being adapted to convert a rotation of the handle into a linear movement of the first and second piston.

4. Tap according to claim 3, wherein each of the first and second toggle mechanism comprises an upper plate rotatably mounted around the centre point, and a lower plate rotatably fixed to the upper plate around a pivot, the upper plate being in direct contact with a lever integrally fixed with the handle, and the lower plate being in direct contact with the first or the second piston.

5. Tap according to claim 1, wherein the distribution unit further comprises a first lower O-ring and a first upper O-ring that are mounted on the first piston, the first lower O-ring being disposed so as to hermetically obstruct the first outlet when the handle is in the second position, and the first upper O-ring being disposed so as to prevent the first liquid to reach a handle mechanism, and further comprises a second lower O-ring and a second upper O-ring that are mounted on the second piston, the second lower O-ring being disposed so as to hermetically obstruct the second outlet when the handle is in the second position, and the second upper O-ring being disposed so as to prevent the second liquid to reach the handle mechanism.

6. Tap according to claim 5, wherein the first and/or second upper and/or lower O-rings are arranged so that when the handle is released, the pressure forces differential of the first and/or second upper and/or lower O-rings causes the first and/or second piston to move so that the handle reaches the closed position.

7. Tap according to the claim 5, wherein a first lower external diameter of the first lower O-ring and a first upper external diameter of the first upper O-ring are equal, and/or wherein a second lower external diameter of the second lower O-ring and a second upper external diameter of the second upper O-ring are equal.

8. Tap according to claim 5, wherein each of the first and second upper and lower O-rings has a circular, ellipsoidal or rectangular section.

9. Tap according to claim 1, wherein the distribution unit further comprises:

a first spring that is coiled up around a first portion of said first piston, and a second spring that is coiled up around a second portion of said second piston, wherein said first spring is compressed when the handle is moved from the close position to the first open position, and wherein said second spring is compressed when the handle is moved from the close position to the second open position.

10. Tap according to claim 1, wherein the tap further comprises at least one solenoid valve activated by the handle for dispensing a predetermined volume of the first or second liquid.

11. Tap according to claim 1, wherein the first angle is smaller than the second angle, and wherein the second angle is smaller than the third angle.

12. Tap according to claim 11, wherein the value of the first angle is comprised between 25° and 35°, the value of the second angle is comprised between 40° and 50°, and the value of the third angle is comprised between 55° and 65°.

13. Tap according to claim 12, wherein the value of the first angle is about 30°, the value of the second angle is about 45° and the value of the third angle is about 60°.

14. Tap according to claim 1, wherein said handle is adapted to rotate around a rotation axis passing through the centre point.

15. Tap according to claim 1, wherein said rotation axis is perpendicular to the reference axis.

* * * * *